United States Patent
Kim et al.

(10) Patent No.: US 9,904,250 B2
(45) Date of Patent: Feb. 27, 2018

(54) METHOD AND DEVICE FOR PROCESSING HOLOGRAPHIC IMAGE

(71) Applicant: SAMSUNG ELECTRONICS CO., LTD., Suwon-si (KR)

(72) Inventors: Yuntae Kim, Suwon-si (KR); Juwon Seo, Osan-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 15/280,184

(22) Filed: Sep. 29, 2016

(65) Prior Publication Data

US 2017/0090419 A1    Mar. 30, 2017

(30) Foreign Application Priority Data

Sep. 30, 2015    (KR) .................. 10-2015-0138010

(51) Int. Cl.
  *G06K 9/76*    (2006.01)
  *G03H 1/08*    (2006.01)

(52) U.S. Cl.
  CPC ......... *G03H 1/0891* (2013.01); *G03H 1/0841* (2013.01)

(58) Field of Classification Search
  CPC ............... G03H 1/2294; G03H 1/0808; G03H 2210/30; G03H 1/22
  USPC ....... 382/170, 171, 210, 214, 278, 282, 307; 358/3.26, 3.27, 537
  See application file for complete search history.

(56) References Cited

U.S. PATENT DOCUMENTS

| | | | | |
|---|---|---|---|---|
| 6,646,773 | B2 * | 11/2003 | Garner ................... | G03H 1/08 359/1 |
| 8,218,211 | B2 * | 7/2012 | Kroll ..................... | G03H 1/02 359/32 |
| 8,368,727 | B2 | 2/2013 | Smith et al. | |
| 8,384,973 | B2 * | 2/2013 | Leister ................. | G03H 1/0808 359/21 |
| 8,395,616 | B2 | 3/2013 | Schwerdtner | |
| 8,437,057 | B2 * | 5/2013 | Schwerdtner .......... | G03H 1/08 359/9 |
| 8,441,703 | B2 * | 5/2013 | Leister ................. | G03H 1/0808 359/32 |
| 8,482,828 | B2 * | 7/2013 | Leister ................. | G03H 1/0808 359/29 |

(Continued)

FOREIGN PATENT DOCUMENTS

| | | |
|---|---|---|
| JP | 2008-217990 A | 9/2008 |
| JP | 2011-186439 A | 9/2011 |
| KR | 10-2013-0108327 A | 10/2013 |

*Primary Examiner* — Yosef Kassa
(74) *Attorney, Agent, or Firm* — Sughrue Mion, PLLC

(57) ABSTRACT

Provided are a method and device for processing a holographic image. The method includes generating a complex array by performing frequency conversion of input image data on a pixel-by-pixel basis, encoding per-pixel amplitude information and per-pixel phase information represented by complex numbers included in the complex array into real number values, sorting the real number values of the per-pixel amplitudes according to a magnitude and setting a prescribed-order number from among the real number values of the per-pixel amplitudes to a reference value, and normalizing the real number values of the per-pixel amplitudes based on the reference value.

20 Claims, 15 Drawing Sheets

(56) References Cited

U.S. PATENT DOCUMENTS

| | | | |
|---|---|---|---|
| 8,487,980 B2* | 7/2013 | Kroll | G02B 26/0875 |
| | | | 345/419 |
| 2010/0128334 A1 | 5/2010 | Nakamura | |
| 2010/0271675 A1 | 10/2010 | Leister et al. | |
| 2013/0154498 A1 | 6/2013 | Missbach | |

* cited by examiner

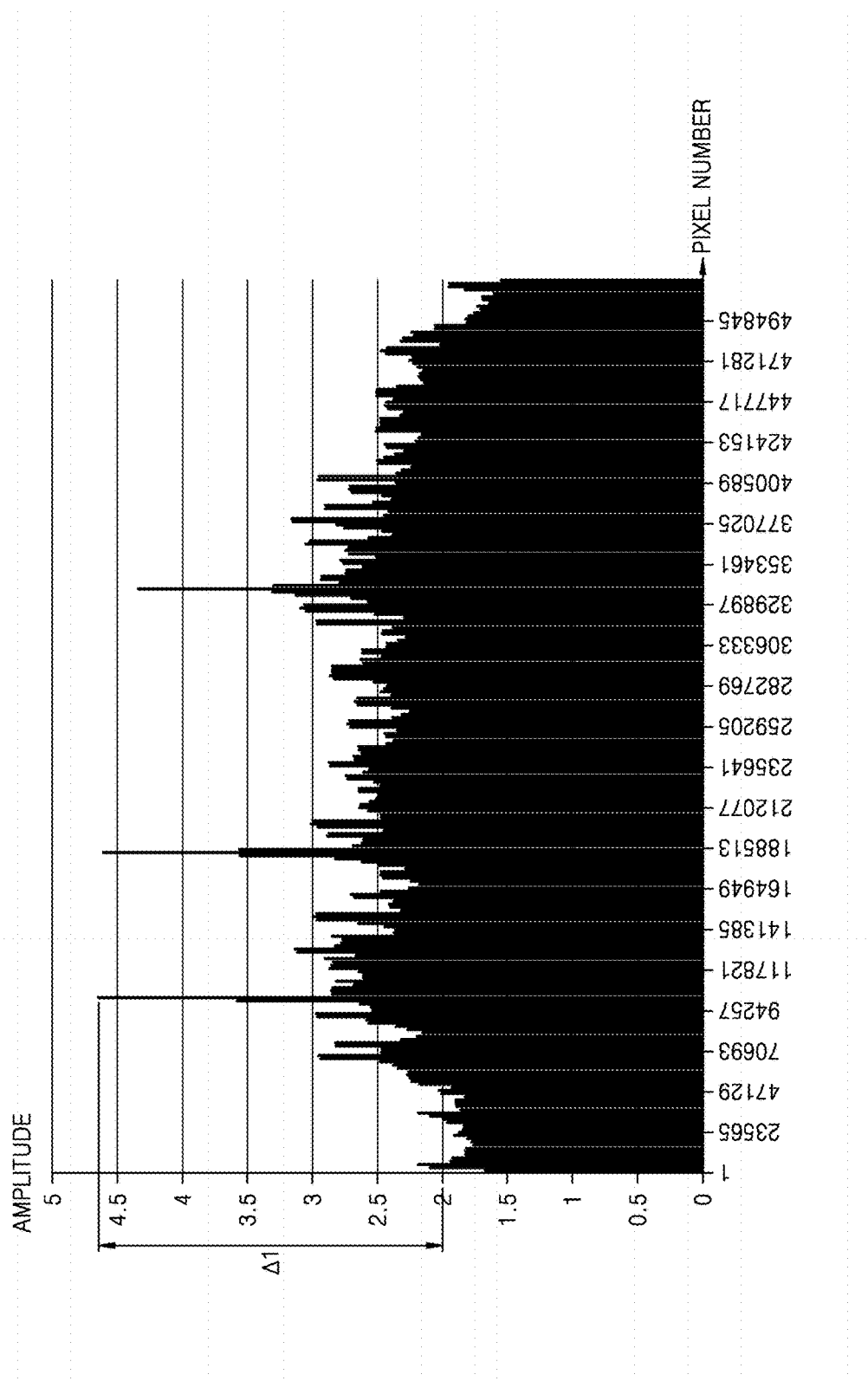

METHOD AND DEVICE FOR PROCESSING HOLOGRAPHIC IMAGE

CROSS-REFERENCE TO RELATED APPLICATION

This application claims priority from Korean Patent Application No. 10-2015-0138010, filed on Sep. 30, 2015, in the Korean Intellectual Property Office, the disclosure of which is incorporated herein by reference in its entirety.

BACKGROUND

1. Field

Methods and apparatuses consistent with exemplary embodiments relate to processing a holographic image, and more particularly, to processing a computer generated hologram (CGH) image.

2. Description of the Related Art

As three-dimensional (3D) graphics technology has developed, a large number of stereoscopic images for displaying 3D images have been generated. However, a user may experience various problems when viewing a 3D movie generated using 3D images, such as eye fatigue or restrictions that adversely affect the user's view. To address the above problems, a method of realizing 3D images by using a hologram has been recently highlighted.

Recently, many people consider a hologram service as the final goal of 3D stereoscopic video processing technology. The hologram system may provide a natural image representation without limitation of observation positions by representing depths so that an observation may be made from any viewpoint from within a predetermined range. Since holographic images may be viewed as natural images without the need to wear glasses, various problems of 3D images may be eliminated.

Holographic service types are expected to diversify, and holographic technologies are predicted to be available in various application fields. Examples of the application fields include advertisement, video communication, video conference, broadcast services, education, simulation, and military training. Also, in the case of home shopping, product selection may be facilitated by displaying real product images of the same sizes as the respective products.

A complex spatial light modulator (SLM) that is capable of simultaneously controlling the amplitude and phase of light has been used to implement the holographic technologies. The SLM may implement a 3D image by modulating the amplitude and phase of incident light according to the type of a 3D object. Therefore, research has been actively conducted into technology of reproducing high resolution holograms in real-time by generating a digital hologram such as a computer generated hologram (CGH).

SUMMARY

Exemplary embodiments provide methods and devices for processing holographic images.

According to an aspect of an exemplary embodiment, a method for processing a holographic image includes generating a complex array by performing frequency conversion of input image data on a pixel-by-pixel basis, encoding per-pixel amplitude information and per-pixel phase information represented by complex numbers included in the complex array into real number values, sorting the real number values of the per-pixel amplitude information according to a magnitude and setting a prescribed-order number from among the real number values of the per-pixel amplitude information to a reference value, and normalizing the real number values of the per-pixel amplitude information based on the reference value.

The normalizing the real number values may include dividing each of the real number values of the per-pixel amplitude information by the reference value.

The normalizing the real number values may include changing at least one from among the real number values of the per-pixel amplitude to the reference value when the at least one from among the real number values of the per-pixel amplitude information is greater than the reference value.

The normalizing the real number values may include receiving a control signal that relates to a brightness of a hologram image, and normalizing the real number values of the per-pixel amplitude information using a weight that corresponds to the control signal.

The setting a prescribed-order number from among the real number values of the per-pixel amplitude information to a reference value may include setting a first-order value to a first reference value and setting a second-order value to a second reference value.

The normalizing the real number values may include changing at least one from among the real number values of the per-pixel amplitude information to be between the first reference value and the second reference value when the at least one from among the real number values of the per-pixel amplitude information is greater than the first reference value, and dividing each of the changed at least one from among the real number values of the per-pixel amplitude information by the first reference value.

The changing the at least one from among the real number values of the per-pixel amplitude information to be between the first reference value and the second reference value may be performed according to Equation 1.

$$I_{mod} = I_2 + \frac{(I_1 - I_2) \times (I - I_2)}{I_{max} - I_2} \quad \text{[Equation 1]}$$

where I is the at least one from among the real number values of the per-pixel amplitude information to be changed, $I_{mod}$ is a changed at least one from among the real number values of the per-pixel amplitude information, $I_1$ is the first reference value, $I_2$ is the second reference value, and $I_{max}$ is a maximum value of the per-pixel amplitude information.

The normalizing the real number values may include changing at least one from among the real number values of the per-pixel amplitude information when the at least one from among the real number values of the per-pixel amplitude information is less than the first reference value and greater than the second reference value, and dividing each of the changed at least one from among the real number values of the per-pixel amplitude information by the first reference value.

The changing the at least one from among the real number values of the per-pixel amplitude information may be performed according to Equation 2.

$$I_{mod} = \frac{(I \times I_2)}{I_1} \quad \text{[Equation 2]}$$

where I is the at least one from among the real number values of the per-pixel amplitude information to be changed, $I_{mod}$ is a changed at least one from among the real number values of the per-pixel amplitude information, $I_1$ is the first reference value, and $I_2$ is the second reference value.

The method for processing a holographic image may further include converting each of the normalized real number values of the per-pixel amplitude information into a respective integer, and generating a computer generated hologram (CGH) image based on the converted integer values.

According to an aspect of another exemplary embodiment, a holographic image processor includes a frequency converted configured to generate a complex array by performing frequency conversion of input image data on a pixel-by-pixel basis, an encoder configured to encode per-pixel amplitude information and per-pixel phase information represented by complex numbers included in the complex array into real number values, a reference value setter configured to sort the real number values of the per-pixel amplitude information according to a magnitude and to set a prescribed-order number from among the real number values of the per-pixel amplitude information to a reference value, and a normalizer configured to normalize the real number values of the per-pixel amplitude information based on the reference value.

The normalizer may be further configured to divide each of the real number values of the per-pixel amplitude information by the reference value.

The normalizer may be further configured to change at least one from among the real number values of the per-pixel amplitude information to the reference value when the at least one from among the real number values of the per-pixel amplitude information is greater than the reference value and to divide each of the real number values of the per-pixel amplitude information by the reference value.

The holographic image processor may further include a receiver configured to receive, from a user, a control signal that relates to a brightness of a hologram image, and the normalizer may be further configured to use a weight that corresponds to the control signal for performing the normalization.

The reference value setter may be further configured to set a first-order value from among the real number values of the per-pixel amplitude information to a first reference value and to set a second-order value from among the real number values of the per-pixel amplitude information to a second reference value.

The normalizer may be further configured to change at least one from among the real number values of the per-pixel amplitude information to be between the first reference value and the second reference value when the at least one from among the real number values of the per-pixel amplitude information is greater than the first reference value and to divide each of the changed at least one from among the real number values of the per-pixel amplitude information by the first reference value.

The normalizer may be further configured to change the at least one from among the real number values of the per-pixel amplitude information to be between the first reference value and the second reference value according to Equation 1.

$$I_{mod} = I_2 + \frac{(I_1 - I_2) \times (I - I_2)}{I_{max} - I_2} \quad \text{[Equation 1]}$$

where I is the at least one from among the real number values of the per-pixel amplitude information to be changed, $I_{mod}$ is a changed at least one from among the real number values of the per-pixel amplitude information, $I_1$ is the first reference value, $I_2$ is the second reference value, and $I_{max}$ is a maximum value of the perpixel amplitude information.

The normalizer may be further configured to change at least one from among the real number values of the per-pixel amplitude information when the at least one from among the real number values of the per-pixel amplitude information is less than the first reference value and greater than the second reference value, and to divide each of the changed at least one from among the real number values of the per-pixel amplitude information by the first reference value.

The normalizer may be further configured to change the at least one from among the real number values of the per-pixel amplitude information according to Equation 2.

$$I_{mod} = \frac{(I \times I_2)}{I_1} \quad \text{[Equation 2]}$$

where I is the at least one from among the real number values of the per-pixel amplitude information to be changed, $I_{mod}$ is a changed at least one from among the real number values of the per-pixel amplitude information, $I_1$ is the first reference value, and $I_2$ is the second reference value.

The holographic image processor may further include a converter configured to convert each of the normalized real number values of the per-pixel amplitude information into a respective integer, and a computer generated hologram (CGH) image generator configured to generate a CGH image based on the converted integer values.

BRIEF DESCRIPTION OF THE DRAWINGS

The above and/or other aspects will become apparent and more readily appreciated from the following description of exemplary embodiments, taken in conjunction with the accompanying drawings in which:

FIG. 3A is a graph illustrating a distribution of real number values of the amplitude per pixel in a first frame.

DETAILED DESCRIPTION

Figure 1:
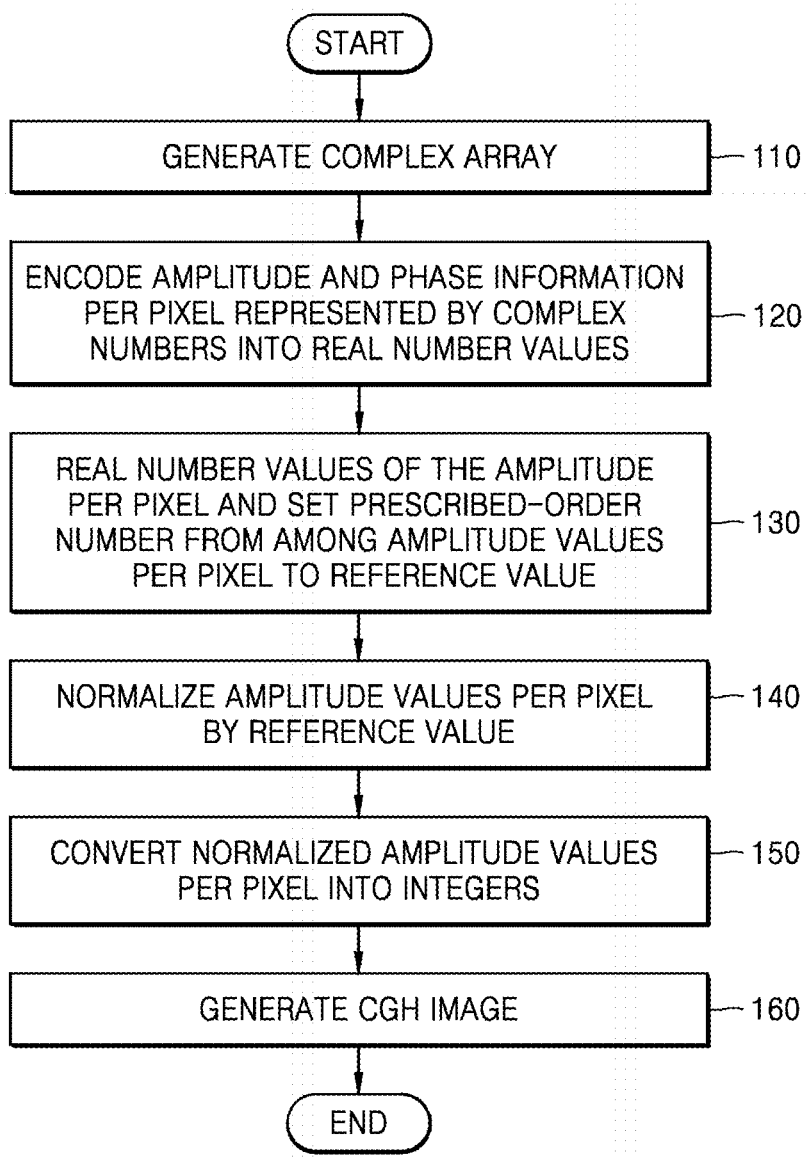
FIG. 1 is a flowchart of a method for processing a holographic image, according to an exemplary embodiment.

The terms used in the present specification have been selected from currently widely used general terms in consideration of the functions in the present inventive concept. However, the terms may vary according to the intention of one of ordinary skill in the art, case precedents, and the advent of new technologies. Also, in special cases, the meanings of the terms selected by the applicant are described below in the description section. Accordingly, the terms used in the present specification are defined based on their meanings in relation to the contents discussed throughout the specification, and not by their simple meanings.

In the present specification, when a constituent element "connects" or is "connected" to another constituent element, the constituent element may contact or be connected to the other constituent element not only directly, but also electrically via at least one of other constituent elements interposed therebetween. Also, when a part "includes" a certain constituent element, unless specified otherwise, it may not be construed to exclude another constituent element but may be construed to further include other constituent elements.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Terms such as "include" or "comprise" may not be construed to necessarily include any and all constituent elements or steps described in the specification, but may be construed to exclude some of the constituent elements or steps or further include additional constituent elements or steps.

Also, terms such as "first" and "second" are used herein merely to describe a variety of constituent elements, but the constituent elements are not limited by the terms. Such terms are used only for the purpose of distinguishing one constituent element from another constituent element.

The attached drawings for illustrating preferred exemplary embodiments of the present inventive concept are referred to in order to gain a sufficient understanding of the present inventive concept, the merits thereof, and the objectives accomplished by the implementation of the present inventive concept. Hereinafter, the present inventive concept will be described by explaining exemplary embodiments of the inventive concept with reference to the attached drawings.

FIG. 1 is a flowchart of a method for processing a holographic image, according to an exemplary embodiment.

Referring to FIG. 1, the method for processing a holographic image is executed by a holographic image processor and may include an operation 110 of generating a complex array by converting a frequency of input image data on a pixel-by-pixel basis, an operation 120 of encoding per-pixel amplitude information and per-pixel phase information represented by complex numbers included in the complex array into real number values, an operation 130 of sorting the real number values of the per-pixel amplitude information according to a magnitude and setting a prescribed-order number from among the real number values of the per-pixel amplitude information to a reference value, and an operation 140 of normalizing the real number values of the per-pixel amplitude information based on the reference value.

In operation 110, the holographic image processor may receive the input image data and perform frequency conversion of the input image data on a pixel-by-pixel basis. Furthermore, the holographic image processor may generate the complex array during the frequency conversion.

The input image data may be image data taken in advance or virtually manufactured image data, such as an animation image. The input image data may be a paused image or a moving image. The input image data may include a two-dimensional (2D) image, and color data and depth data of pixels of the 2D image. In another exemplary embodiment, the input image data may be polygon data or three-dimensional (3D) voxel data.

The holographic image processor may perform frequency conversion per pixel of the input image data. When the input image data includes 2D image and depth data, pixels of the input image data may correspond to pixels of the 2D image. In another exemplary embodiment, when the input image data is polygon data, pixels of the input image data may correspond to respective polygonal surfaces. Furthermore, when the input image data is 3D voxel data, pixels of the input image data may correspond to respective voxels.

The holographic image processor may perform a fast Fourier transform (FFT) operation on each pixel of the input image data. Complex values corresponding to the each pixel of the input image data may be obtained as a result of the FFT operation. The complex values per pixel may include amplitude information and phase information of a diffraction pattern. The holographic image processor may generate a complex array from the complex values. The complex array may be a 2D array or a 3D array comprising complex values. However, a dimension of the complex array may vary.

In operation 120, the holographic image processor may encode the complex values included in the complex array.

Therefore, the amplitude information and phase information represented by complex numbers may be converted into real numbers.

Figure 2:
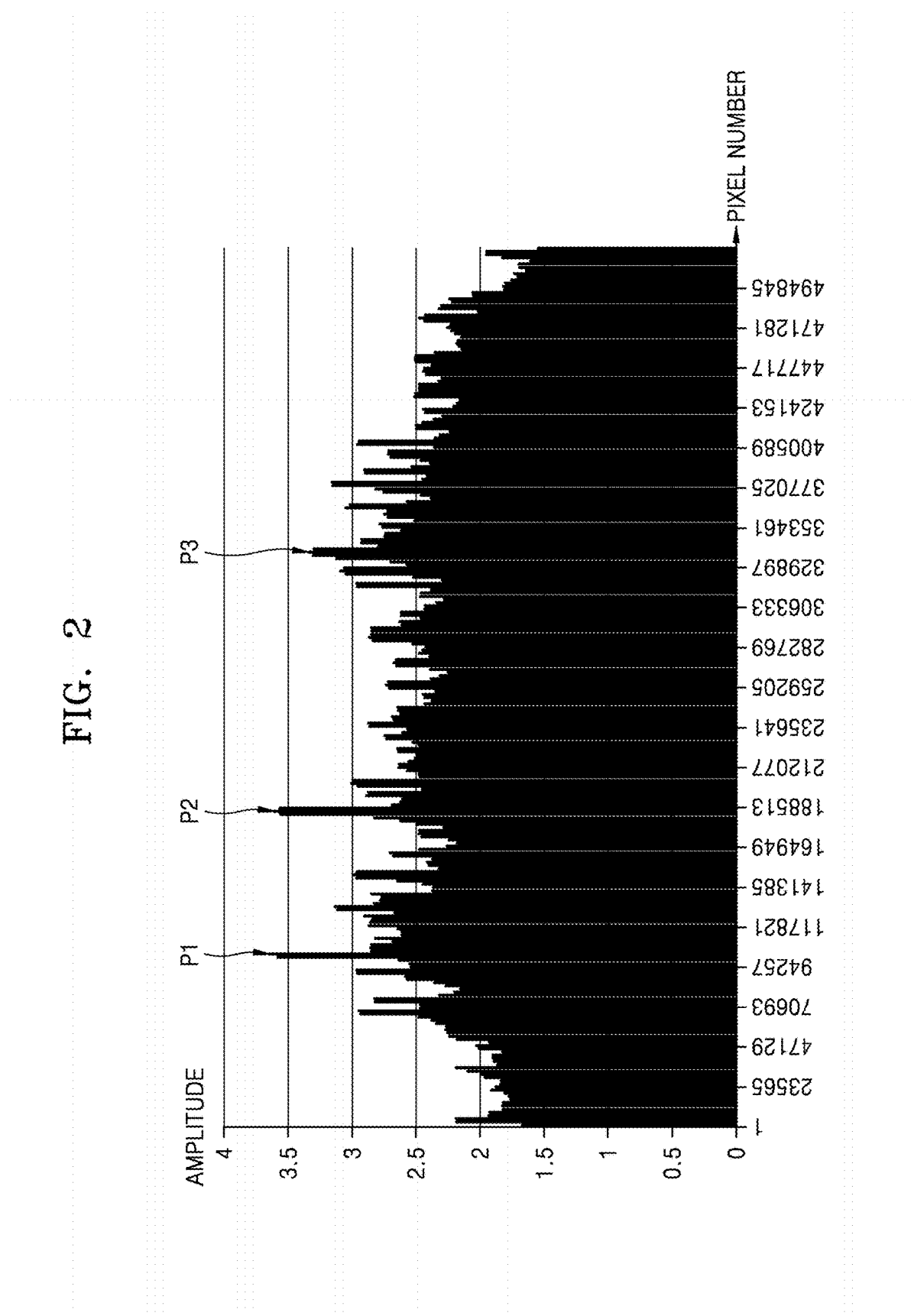
FIG. 2 is a graph illustrating a distribution of real number values of the amplitude per pixel, according to an exemplary embodiment.
Figure 3B:
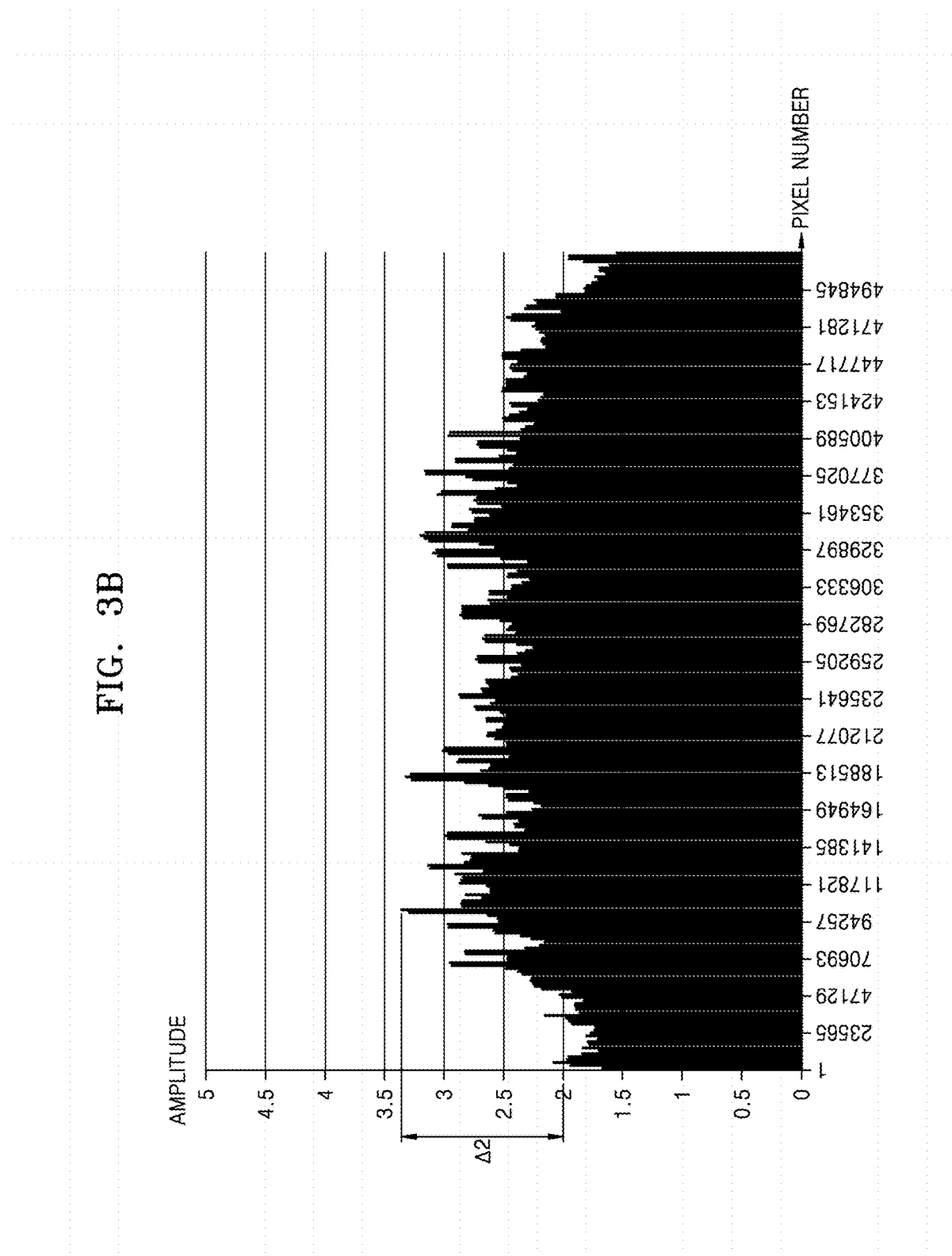
FIG. 3B is a graph illustrating a distribution of real number values of the amplitude per pixel in a next second frame, according to an exemplary embodiment.

In operation 130, the holographic image processor may sort the real number values of the per-pixel amplitude information according to a magnitude. Furthermore, the holographic image processor may set a prescribed-order number from among the real number values of the per-pixel amplitude information to a reference value. For example, the holographic image processor may set an Nth largest value from among the real number values of the amplitude per pixel to a reference value. Here, N may be any natural number greater than 1 and may be set in advance. The value of N may change according to the number of all pixels, a target resolution of a hologram image, or a target value with respect to a total brightness of the hologram image. With reference to FIGS. 2, 3A and 3B, it will be simply described that the Nth largest value, i.e., not the maximum value, is set as a reference value from among the real number values of the amplitude per pixel in operation 130 as below.

FIG. 2 is a graph illustrating a distribution of real number values of the amplitude per pixel, according to an exemplary embodiment. A horizontal axis represents pixel positions and a vertical axis represents real number values of the amplitude per pixel.

Referring to FIG. 2, the real number values of the amplitude per pixel may vary. However, since a range of brightness that can be expressed by a hologram image is fixed, a holographic image processor needs to normalize the real number values of the amplitude per pixel. A method of dividing the maximum value by remaining values is one of the normalization methods. However, when real number values of the amplitude of a small number of pixels are too great as compared with real number values of the amplitude of the remaining pixels, a resulting brightness of a hologram image may be too greatly reduced by normalizing the real number values of the amplitude per pixel based on the maximum value. For example, as illustrated in FIG. 2, real number values of the amplitude per pixel of P1, P2, and P3 may be much greater than other real number values of the amplitude per pixel. Therefore, the real number values of the amplitude of remaining pixels, excluding the small number of pixels having unusually high real number values of the amplitude such as P1, P2, and P3, may be normalized to be too low by dividing the maximum amplitude value by the real number values of the amplitude per pixel.

FIG. 3A is a graph illustrating a distribution of real number values of the amplitude per pixel in a first frame, and FIG. 3B is a graph illustrating a distribution of real number values of the amplitude per pixel in a next second frame, according to an exemplary embodiment.

Referring to FIG. 3A, a difference between a maximum value $I_{max}$ and an average value of real number values of the amplitude per pixel $I_{avg}$ may be $\Delta 1$ in the first frame. However, referring to FIG. 3B, a difference between a maximum value $I_{max}$ and an average value of real number values of the amplitude per pixel $I_{avg}$ may be reduced to $\Delta 2$ in the second frame. This is because those real number values of the amplitude may be significantly changed due to a very small number of pixels, even though the first and second frames are adjacent to each other.

In FIG. 3A, since the difference ($\Delta 1$) between the maximum value $I_{max}$ and the average value of real number values of the amplitude per pixel $I_{avg}$ is relatively large, a brightness of a hologram image may become relatively low by normalizing remaining real number values of the amplitude based on the maximum value $I_{max}$. Meanwhile, in FIG. 3B, since the difference ($\Delta 2$) between the maximum value $I_{max}$ and the average value of real number values of the amplitude per pixel $I_{avg}$ is relatively small, the corresponding brightness of a hologram image may become relatively high compared to FIG. 3A. As described above, when a difference in image brightness between the adjacent frames exists, flicker occurs and users may feel fatigue while watching the image.

The reason why the problems described with respect to FIG. 2 and FIGS. 3A and 3B occur is that a difference between the real number values of the amplitude of the small number of outlier pixels and the real number values of the amplitude of the remaining pixels is relatively large, the small number of pixels being less than the number of all pixels. Therefore, if a middle part of the maximum amplitude value excluding some pixels having high real number values of the amplitude is set as a reference value, the brightness of the hologram image may increase and a sudden change of brightness between adjacent frame images may be prevented. In other words, if an Nth highest amplitude value is set as a reference value, N may be the same as the number of pixel real number values of the amplitude excluded from consideration when setting the reference value. The magnitude of N may be changed according to the number of all pixels. For example, when the number of all pixels increases, the number of the pixels having unusually high real number values of the amplitude, such as P1, P2, and P3 in FIG. 2, may also increase. Therefore, when the number of all pixels increases, the magnitude of N may also increase.

Furthermore, the magnitude of N may vary according to a target value of a total brightness of the hologram image. For example, the lower a reference value for normalization is, the higher a total brightness of the hologram image is. Therefore, a user may increase the magnitude of N when the user wants to brighten the hologram image. However, the user may not easily distinguish a brightness difference of pixels having much larger real number values of the amplitude than the Nth amplitude value if the user excessively increases the magnitude of N, because the real number values of the amplitude greater than the reference value is changed to be the same as or less than the reference value and is divided by the reference value in operation 140 described below. That is, a brightness difference of N upper pixels having large real number values of the amplitude may be not easily distinguished due to normalization. Therefore, the magnitude of N may be set not to be too large to prevent a quality deterioration of the hologram image.

Referring again to FIG. 1, the holographic image processor may normalize real number values of the amplitude per pixel based on the reference value in operation 140. The real number values of the amplitude per pixel may be normalized by applying any of various methods. For example, the holographic image processor may perform a normalization operation by dividing each of the real number values of the amplitude per pixel by the reference value.

Figure 4:
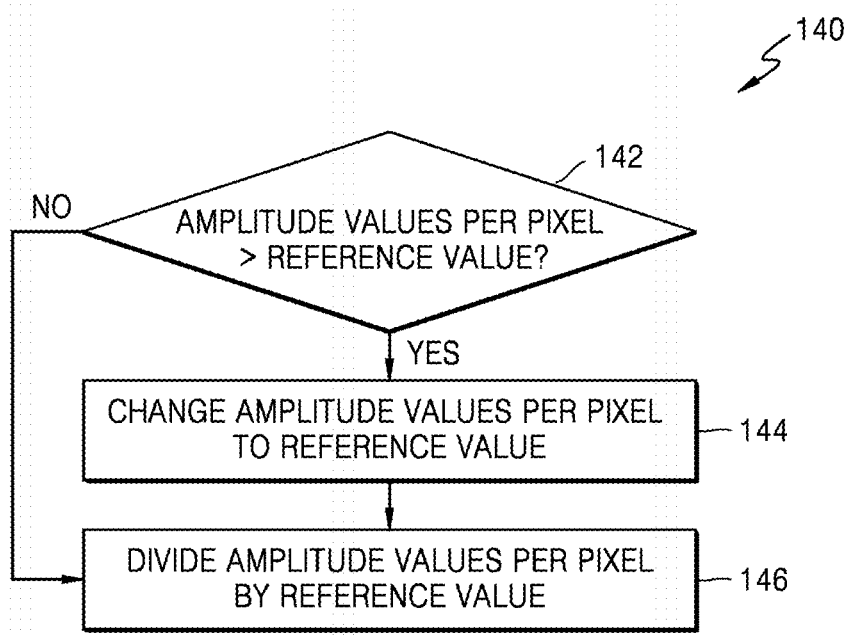
FIG. 4 is a flowchart of an operation process of the holographic image processor in operation 140 of FIG. 1, according to an exemplary embodiment.

FIG. 4 is a flowchart of an operation process of the holographic image processor in operation 140 of FIG. 1, according to an exemplary embodiment.

Referring to FIG. 4, operation 140 may include operation 142 of comparing real number values of the amplitude per pixel with a reference value, operation 144 of changing the real number values of the amplitude per pixel to the reference value when the real number values of the amplitude per pixel are greater than the reference value, and operation 146 of dividing the real number values of the amplitude per pixel by the reference value.

Figure 5A:
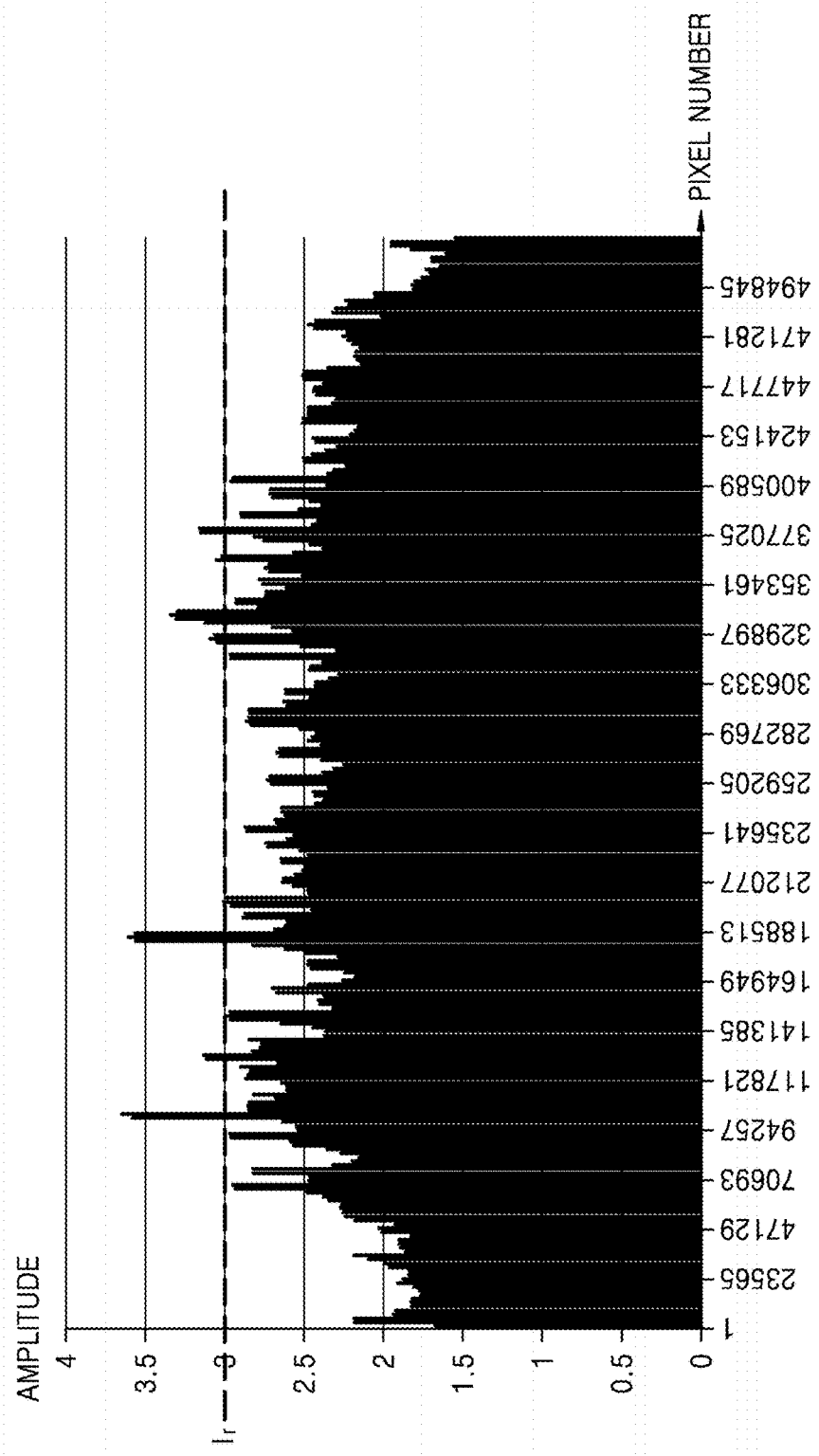
FIGS. 5A and 5B are graphs illustrating a change of distribution of real number values of the amplitude per pixel of FIG. 2 in operation 144 of FIG. 4, according to an exemplary embodiment.
Figure 5B:
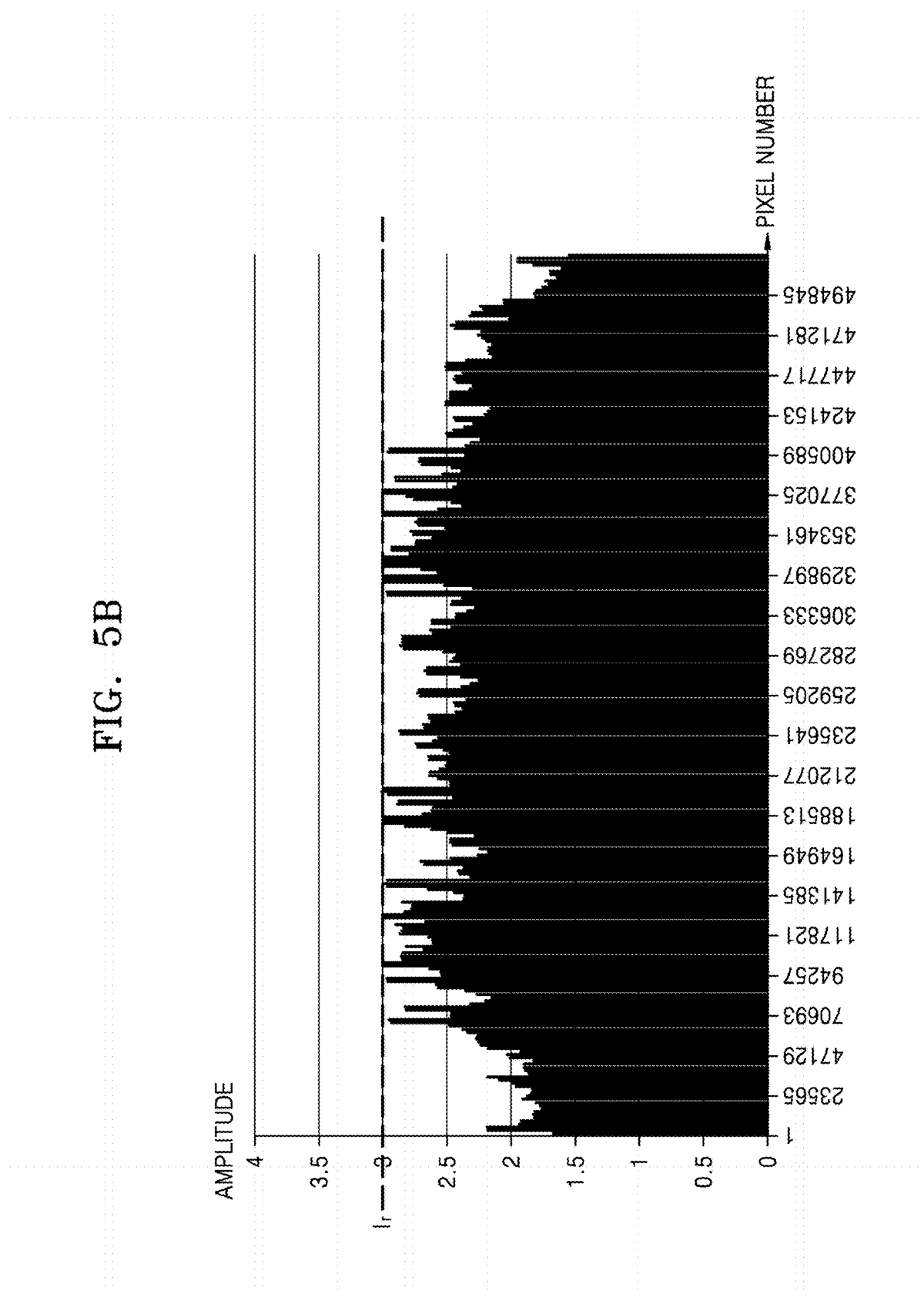

FIGS. 5A and 5B are graphs illustrating a change of distribution of real number values of the amplitude per pixel of FIG. 2 in operation 144 of FIG. 4, according to an exemplary embodiment.

In FIG. 5A, some of the real number values of the amplitude per pixel may be greater than a reference value. However, in operation 144, a holographic image processor may not change real number values of the amplitude per pixel that are less than a reference value $I_r$ and may change real number values of the amplitude per pixel greater than the reference value $I_r$ to the reference value $I_r$. Therefore, as illustrated in FIG. 5B, all of the real number values of the amplitude per pixel may be less than or equal to the reference value $I_r$ after performing operation 144.

Referring again to FIG. 4, the holographic image processor may divide the real number values of the amplitude per pixel by the reference value in operation 146. As all of the real number values of the amplitude per pixel become less than or equal to the reference value after performing operation 144, all of the real number values of the amplitude per pixel may be normalized to have values between 0 and 1 after performing operation 146.

Figure 6:
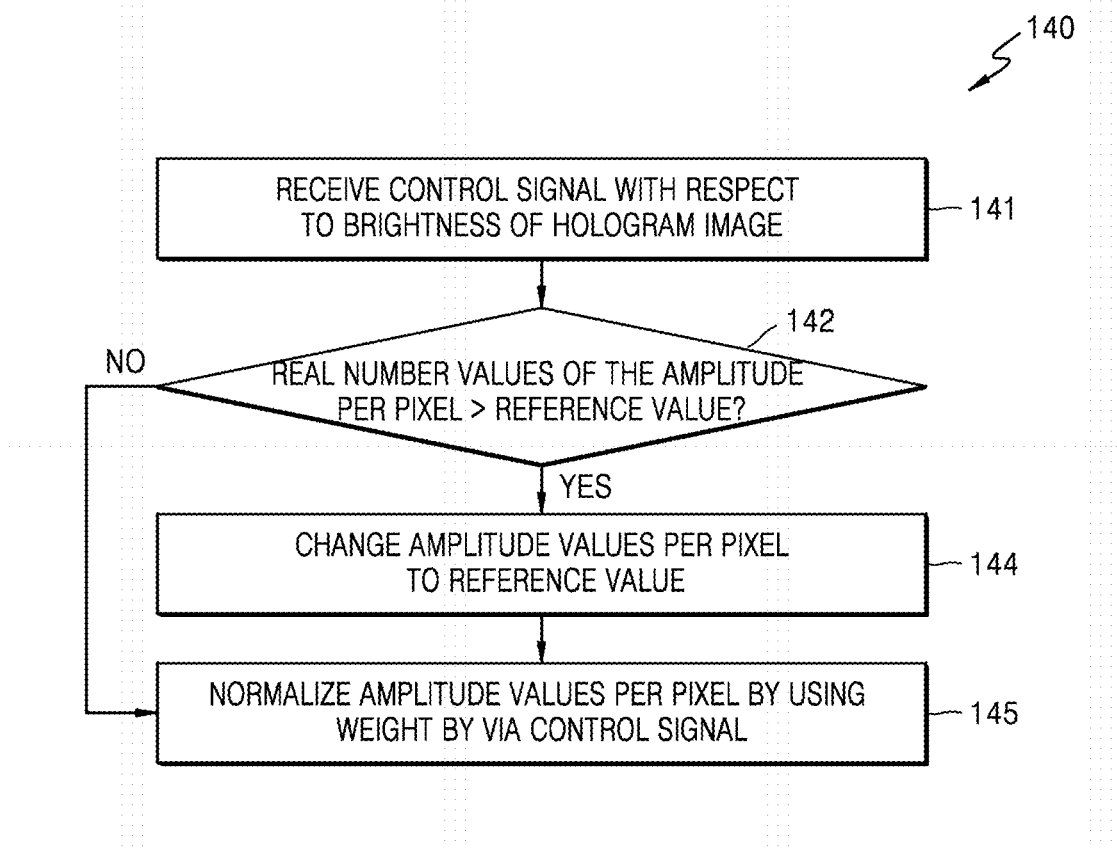
FIG. 6 is a flowchart of an operation process of the holographic image processor in operation 140 of FIG. 1, according to another exemplary embodiment.

FIG. 6 is a flowchart of an operation process of the holographic image processor in operation 140 of FIG. 1, according to another exemplary embodiment.

Referring to FIG. 6, operation 140 may include operation 141 of receiving a control signal that relates to a brightness of a hologram image, operation 142 of comparing real number values of the amplitude per pixel with a reference value, operation 144 of changing the real number values of the amplitude per pixel to the reference value when the real number values of the amplitude per pixel are greater than the reference value, and operation 145 of normalizing the real number values of the amplitude per pixel by using a weight that corresponds to the control signal.

In operation 141, the hologram image processor may receive, from a user, the control signal which relates to the brightness of the hologram image.

Figure 7:
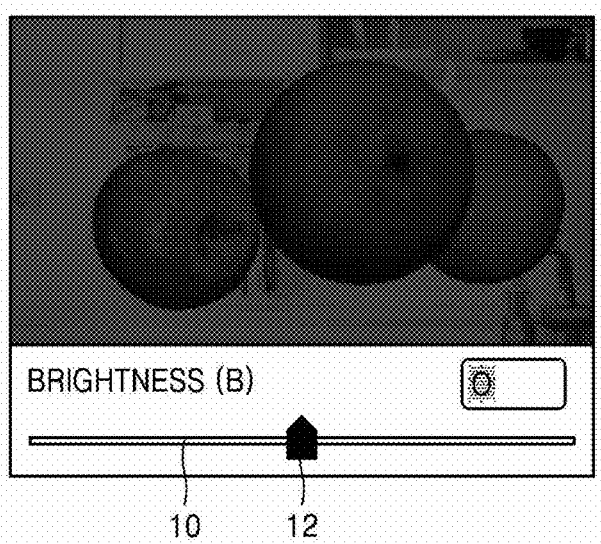
FIG. 7 is a view of a user interface (UI) provided to a user when a hologram image processor receives a brightness control signal of a hologram image, according to another exemplary embodiment.

FIG. 7 is a view of a user interface (UI) provided to a user when a hologram image processor receives a brightness control signal of a hologram image, according to another exemplary embodiment.

Referring to FIG. 7, a slide bar 10 for adjusting a brightness of the hologram image may be displayed on a display of the hologram image processor. When a user inputs a signal for moving a position of an indicator 12 on the slide bar 10 of the display, the hologram image processor may variably set a weight according to the position of the indicator 12. The UI of FIG. 7 is only an example and the exemplary embodiment is not limited thereto. For example, a user may directly input a desired brightness value as a number.

Referring again to FIG. 6, in operation 144, the holographic image processor may change the real number values of the amplitude per pixel to the reference value when the real number values of the amplitude per pixel are greater than the reference value. All of the real number values of the amplitude per pixel may be less than or equal to the reference value after performing operation 144, as described with reference to FIG. 5.

In operation 145, the holographic image processor may normalize the real number values of the amplitude per pixel based on the reference value and the weight which is determined via the control signal. For example, the holographic image processor divides all of the real number values of the amplitude per pixel by the reference value and multiplies the result by a weight factor determined via the control signal. In this case, a magnitude of the weight factor may be greater as a brightness set by a user is higher. The above exemplary embodiment is only an example, and a method of mathematically applying the weight factor may vary. For example, the holographic image processor may divide all of the real number values of the amplitude per pixel by the reference value, and may add the weight factor determined via the control signal to all or some of the normalized real number values of the amplitude per pixel.

The descriptions described above are related to the exemplary embodiment of setting only one reference value in operation 130. However, additional reference values may be used if necessary. In the exemplary embodiments with reference to FIGS. 4, 5A, 5B, 6, and 7, if real number values of the amplitude per pixel are greater than a reference value in a pixel, all of the real number values of the amplitude per pixel are transformed to the reference value. As a result, brightness values of all pixels having real number values of the amplitude per pixel greater than a reference value may be the same. Therefore, it may be difficult to distinguish a brightness difference between the pixels having real number values of the amplitude per pixel greater than a reference value. However, if additional reference values are used, it is possible to distinguish a brightness difference between the pixels having real number values of the amplitude per pixel greater than a reference value.

For example, in operation 130 of FIG. 1, the holographic image processor may set a first-order value to a first reference value and a second-order value to a second reference value from among real number values of the amplitude per pixel. The first reference value may be greater than the second reference value.

Figure 8:
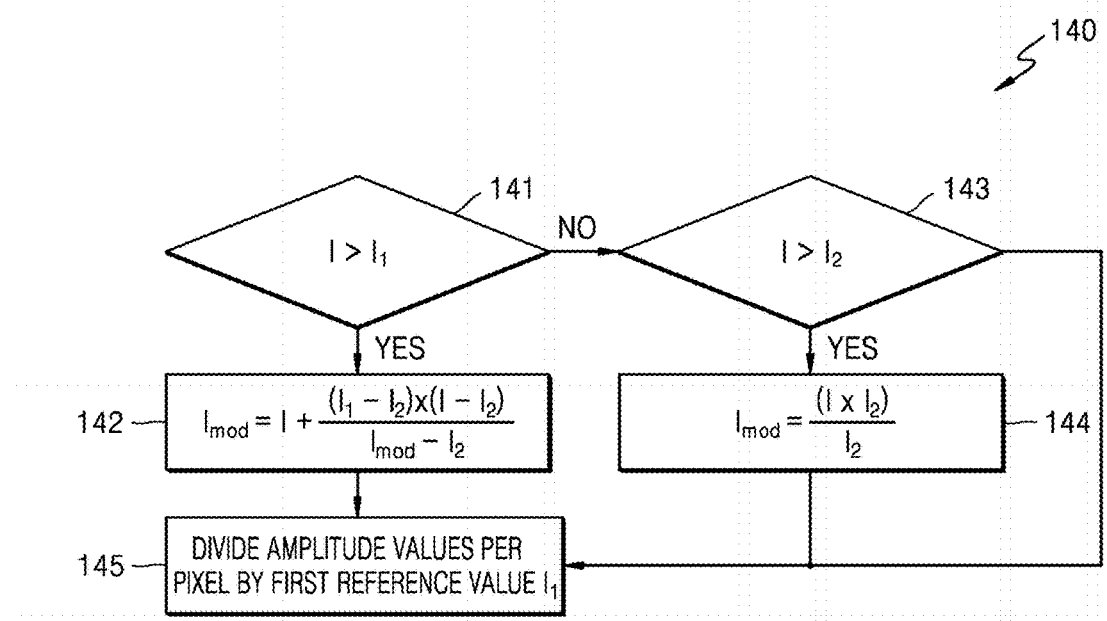
FIG. 8 is a flowchart of an operation process of the holographic image processor in operation 140 of FIG. 1, according to another exemplary embodiment.

FIG. 8 is a flowchart of an operation process of the holographic image processor in operation 140 of FIG. 1, according to another exemplary embodiment.

In FIG. 8, I denotes real number values of the amplitude per pixel to be changed, $I_{mod}$ denotes changed real number values of the amplitude per pixel, $I_1$ denotes a first reference value, $I_2$ denotes a second reference value, and $I_{max}$ denotes a maximum amplitude value per pixel.

Referring to FIG. 8, operation 140 may include operation 141 of comparing the real number values of the amplitude per pixel to be changed I with the first reference value $I_1$, and operation 142 of changing the real number values of the amplitude per pixel to be changed I to be between the first reference value $I_1$ and the second reference value $I_2$ with respect to a pixel of the first reference value $I_1$. Furthermore, operation 140 may include operation 143 of comparing the real number values of the amplitude per pixel to be changed I with the second reference value $I_2$ when the real number values of the amplitude per pixel to be changed I are less than the first reference value $I_1$, and operation 144 of changing the real number values of the amplitude per pixel to be changed I to be much smaller when the real number values of the amplitude per pixel to be changed I are less than the first reference value $I_1$ and greater than the second reference value $I_2$ in a pixel. However, the changed real number values of the amplitude per pixel $I_{mod}$ are greater than the second reference value $I_2$. Furthermore, operation 140 may include operation 145 of dividing all of the real number values of the amplitude per pixel to be changed I by the first reference value $I_1$ after adjusting the real number values of the amplitude per pixel I.

Figure 9:
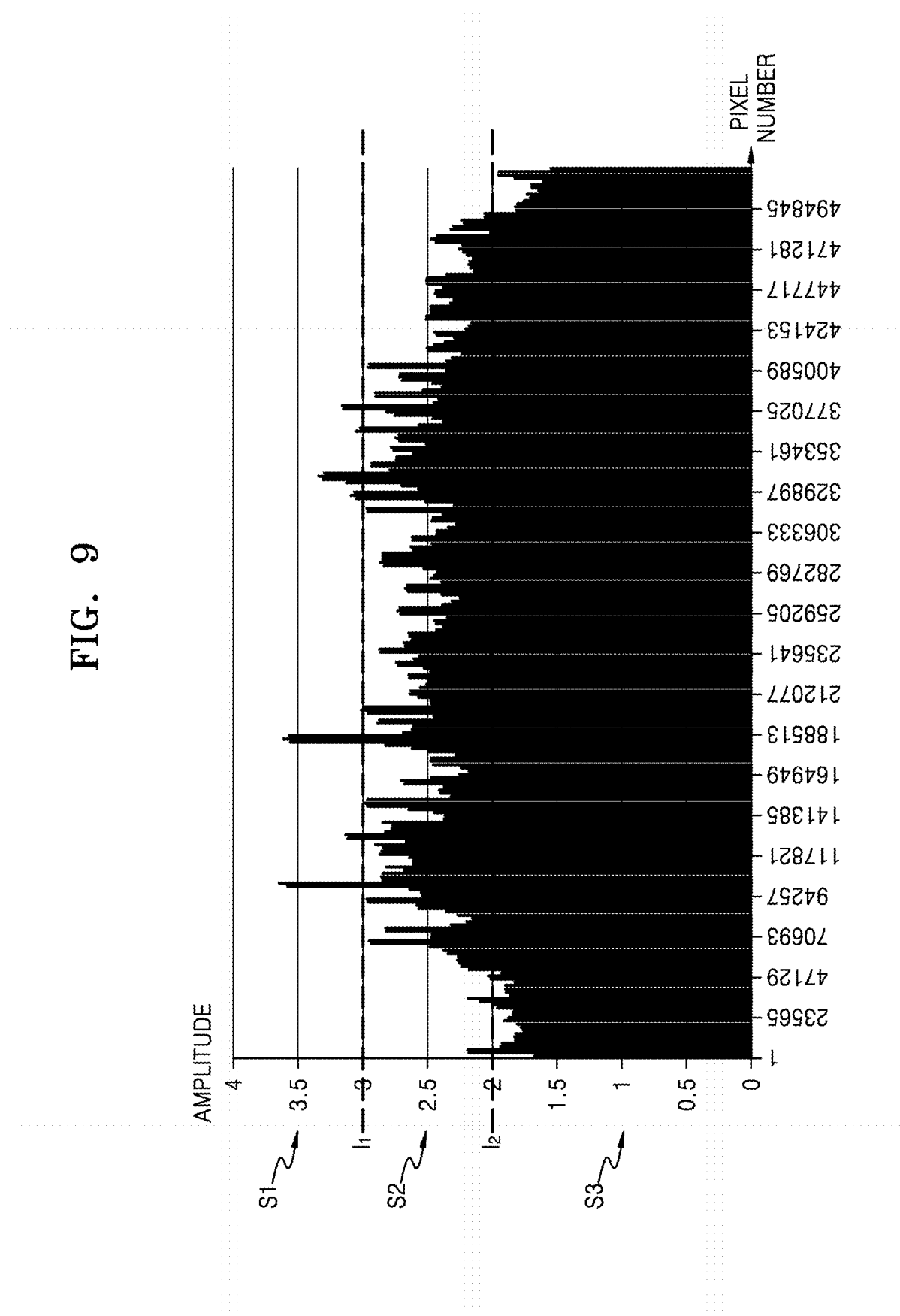
FIG. 9 is a graph illustrating first and second reference values in the graph illustrating the distribution of real number values of the amplitude per pixel of FIG. 2, according to an exemplary embodiment.

FIG. 9 is a graph illustrating first and second reference values $I_1$ and $I_2$ in the graph illustrating the distribution of real number values of the amplitude per pixel of FIG. 2, according to an exemplary embodiment.

Referring to FIG. 9, an $N_1$th value may be determined as the first reference value $I_1$ and an $N_2$th value $N2$ as the second reference value $I_2$ from among the real number values of the amplitude per pixel. Inequalities $N_1 > N_2$ and $I_1 > I_2$ may be satisfied. Pixels in the graph of FIG. 9 may be classified into three groups; pixels having real number values of the amplitude distributed in a region S1 higher than the first reference value $I_1$, pixels having real number values of the amplitude distributed in a region S2 lower than the first reference value $I_1$ and higher than the second reference value $I_2$, and pixels having real number values of the amplitude distributed in a region S3 lower than the second reference value $I_2$.

All of the real number values of the amplitude per pixel to be changed I may be divided by the first reference value $I_1$ in operation 145. The real number values of the amplitude per pixel to be changed I must be less than the first reference value $I_1$ in order that normalized values are between 0 and 1. Therefore, real number values of the amplitude in the region S1 of FIG. 9 may be changed to real number values of the amplitude of the region S2 in operation 142. In other words, in operation 142, a holographic image processor may change the real number values of the amplitude per pixel to be changed I that are greater than the first reference value $I_1$ to be between the first reference value $I_1$ and the second reference value $I_2$.

Although all of the real number values of the amplitude per pixel greater than the reference value are uniformly changed to the reference value in the exemplary embodiments of FIGS. 4, 5A, 5B, 6, and 7, real number values of the amplitude per pixel may be changed according to a magnitude of the real number values of the amplitude per pixel to be changed I in operation 142 of FIG. 8. In operation 142, for example, the real number values of the amplitude per pixel may be changed according to Equation 1.

$$I_{mod} = I_2 + \frac{(I_1 - I_2) \times (I - I_2)}{I_{max} - I_2}$$ [Equation 1]

In Equation 1, I denotes real number values of the amplitude per pixel to be changed, $I_{mod}$ denotes changed real number values of the amplitude per pixel, $I_1$ denotes a first reference value, $I_2$ denotes a second reference value, and $I_{max}$ denotes a maximum amplitude value per pixel. Since $I_{max} > I_2$ and Equation 1 is applied when $I > I_1$, a value of $$\frac{(I_1 - I_2) \times (I - I_2)}{I_{max} - I_2}$$

is always a positive number. In other words, a condition of $I_{mod} > I_2$ may be satisfied. Furthermore, since $I_1 > I_2$ and the Equation 1 are applied when $I > I_1 > I_2$, a condition of $$\frac{(I_1 - I_2) \times (I - I_2)}{I_{max} - I_2} < (I_1 - I_2)$$

may be satisfied. In other words, a condition of $I_2 < I_{mod} < I_1$ may be satisfied. Furthermore, since $I_{mod}$ depends on existing real number values of the amplitude per pixel I, pixels having different existing real number values of the amplitude per pixel to be changed I may also have different changed real number values of the amplitude per pixel $I_{mod}$. Accordingly, it is possible to accurately represent a brightness difference per pixel in a hologram image.

As real number values of the amplitude in the region S1 of FIG. 9 are moved to the region S2 in operation 142, the real number values of the amplitude of the existing region S1 may be less than those of the original region S2. Therefore, a magnitude of the real number values of the amplitude in the region S2 must be smaller in order to maintain a magnitude ranking of the existing real number values of the amplitude per pixel. However, the changes in the real number values of the amplitude in the region S2 may be reduced in order to prevent these values from being less than the real number values of the amplitude in the region S3.

In operation 144, the holographic image processor may reduce the object pixel real number values of the amplitude I which are greater than the second reference value $I_2$ and less than the first reference value $I_1$. However, the object pixel real number values of the amplitude I changed in operation 144 may be greater than the second reference value $I_2$.

In operation 144, real number values of the amplitude per pixel may be changed according to, for example, Equation 2.

$$I_{mod} = \frac{(I \times I_2)}{I_1}$$ [Equation 2]

In Equation 2, I denotes real number values of the amplitude per pixel to be changed, $I_{mod}$ denotes changed real number values of the amplitude per pixel, $I_1$ denotes a first reference value, and $I_2$ denotes a second reference value. $I_{mod}$ may be less than I before changing, since $I_1 > I_2$ in Equation 2. Since $I_{mod}$ depends on existing real number values of the amplitude per pixel I, pixels having different existing real number values of the amplitude per pixel to be changed I may also have different changed real number values of the amplitude per pixel $I_{mod}$. Accordingly, it is possible to accurately represent a brightness difference per pixel in a hologram image.

Referring again to FIG. 1, the method of processing a holographic image of the holographic image processor may further include operation 150 of converting normalized real number values of the amplitude per pixel into integers, and operation 160 of generating a computer generated hologram (CGH) image based on the converted integer values.

In operation 150, the holographic image processor may convert the normalized real number values of the amplitude per pixel into integer values. For example, the holographic image processor may convert the normalized real number values of the amplitude per pixel into 8-bit unsigned integer values.

In operation 160, a CGH image may be generated based on the converted integer values resulting from operation 150. The holographic image processor may generate a hologram image, which is visible to a user, based on the CGH image generated in operation 160.

Figure 10A:
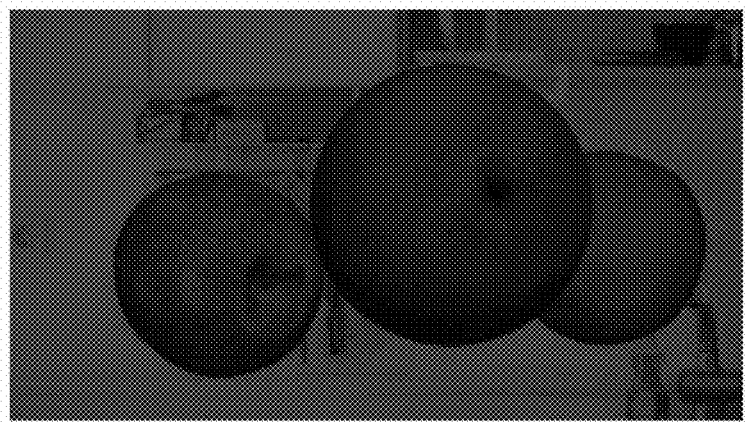
FIG. 10A is a hologram image generated by using a conventional method of processing a holographic image.
Figure 10B:
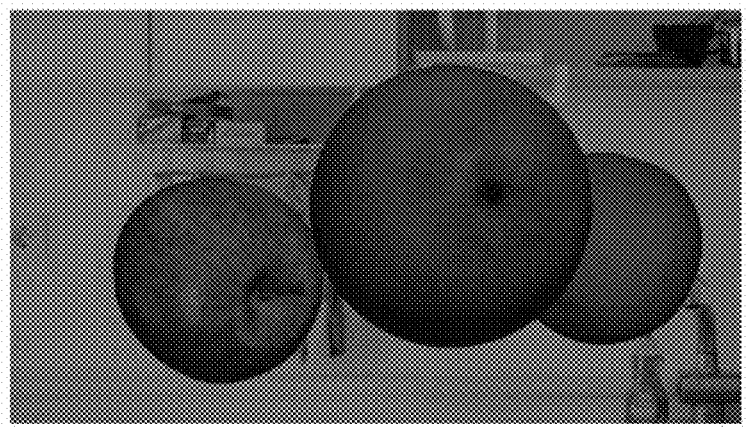
FIG. 10B is a hologram image generated by using the method for processing a holographic image according to an exemplary embodiment of FIG. 1.

FIG. 10A shows a hologram image generated by using a conventional method of processing a holographic image, and FIG. 10B shows a hologram image generated by using the method for processing a holographic image according to an exemplary embodiment of FIG. 1.

In FIG. 10A, a brightness of the whole hologram image may be set to be relatively low because of using the maximum amplitude value per pixel when normalizing the real number values of the amplitude per pixel. Therefore, a user may feel fatigue as the whole hologram image is displayed dark. By contrast, in FIG. 10B, the real number values of the amplitude per pixel are normalized in operation 140 by the reference value set in operation 130. Accordingly, a corresponding brightness of the whole hologram image may be set to be relatively high. Furthermore, a user may feel less fatigue as a brightness difference between frames of the hologram image is reduced.

Figure 11:
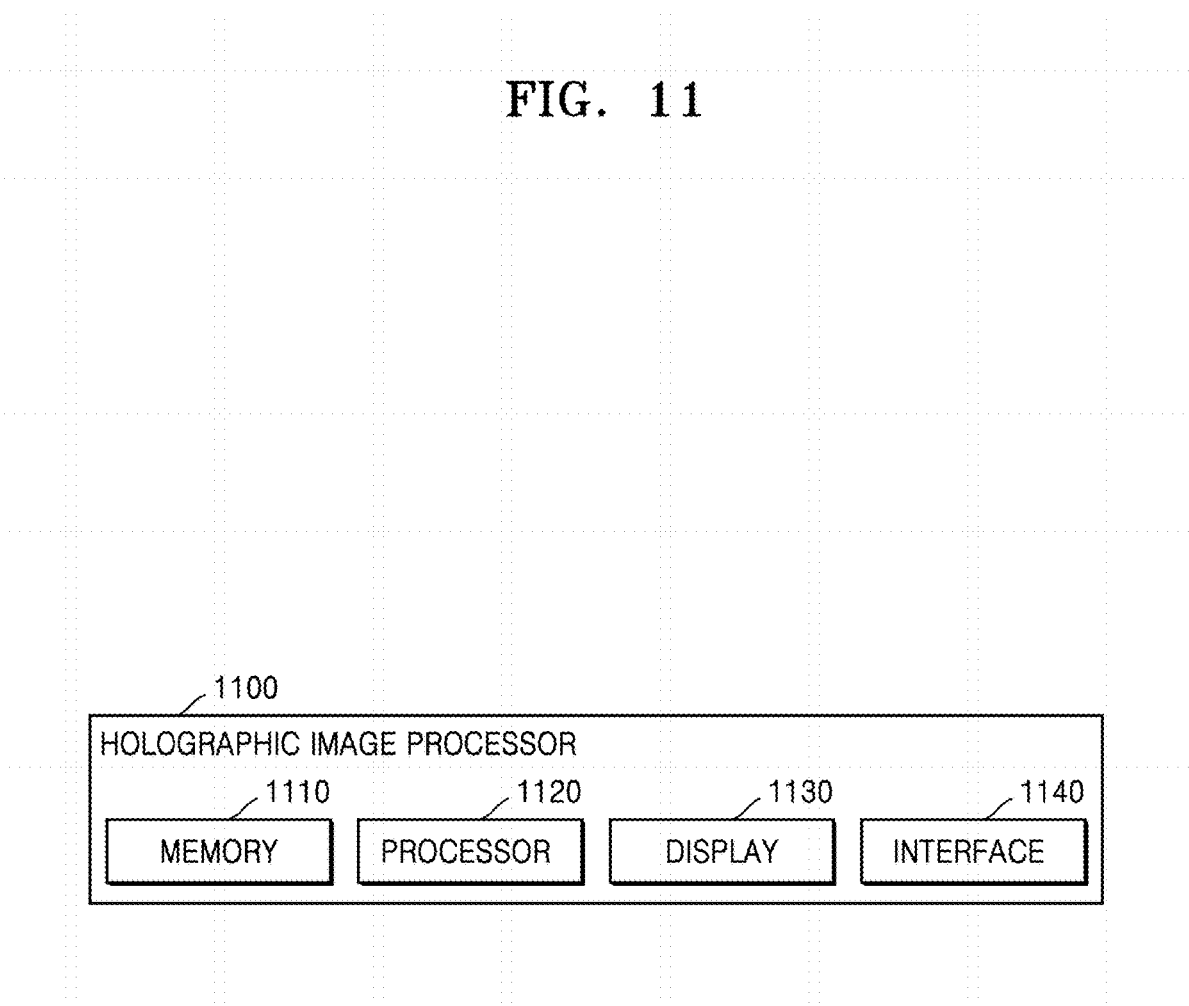
FIG. 11 is a block diagram of a holographic image processor, according to another exemplary embodiment.

FIG. 11 is a block diagram of a holographic image processor 1100, according to another exemplary embodiment.

Referring to FIG. 11, the holographic image processor 1100 generates a computer generated hologram (CGH) image by performing CGH processing on an input image, and displays the generated CGH image as a holographic image that a user may see in a virtual three-dimensional (3D) space. The CGH processing may be defined to include a series of processes that are performed until the CGH image is generated by the holographic image processor 1100. In addition, the holographic image may include a still image, or a video reproduced as a hologram.

A hologram technique is a kind of 3D space representing technology to reproduce an object in a 3D space by adjusting the amplitude and phase of light, and accordingly, a user may have an unrestricted view and may not experience 3D visual fatigue. Therefore, devices that realize a high resolution holographic image in real-time by using a complex spatial light modulator (SLM) that is capable of controlling the amplitude and phase of light simultaneously have been developed. A holographic image may be displayed in a 3D space by using an interference pattern between an object wave and a reference wave. Recently, a CGH technology that may provide a hologram on a flat panel display by processing an interference pattern for reproducing a holographic video has been utilized.

In a method of generating a digital hologram, e.g., CGH technology, a hologram is generated by approximating optical signals and computing an interference pattern generated by mathematical calculation. Since a 3D object consists of a set of 3D points, the method of generating a digital hologram calculates point holograms that respectively correspond to all 3D points configuring a 3D object so as to represent a complete hologram.

Referring to FIG. 11, the holographic image processor 1100 may include a memory 1110, a processor 1120, a display 1130, and an interface 1140. In FIG. 11, only elements that are related to one or more exemplary embodiments as described above are shown as being included in the holographic image processor 1100. Therefore, one of ordinary skill in the art will appreciate that universal elements other than the elements shown in FIG. 11 may be further included in the holographic image processor 1100.

The holographic image processor 1100 may be, for example, any of a desktop computer, a laptop computer, a smartphone, a personal digital assistant (PDA), a portable media player, a video game console, a television set-top box, a tablet device, an E-book reader, a wearable device, etc., but is not limited thereto. That is, any of various devices may be included within a range of the holographic image processor 1100.

The processor 1120 is hardware for controlling overall operations and functions of the holographic image processor 1100. For example, the processor 1120 may drive an operating system (OS), call a graphics application programming interface (API) for performing the CGH processing, and execute a graphics driver. In addition, the processor 1120 may execute various applications stored in the memory 1110, e.g., a hologram reproducing application, a Web browsing application, a game application, a video application, etc.

Further, the processor 1120 may execute the method of processing a holographic image of FIG. 1. The processor 1120 may be implemented as any of a central processing unit (CPU), a graphic processing unit (GPU), an application processor (AP), etc.

The memory 1110 is hardware for storing various data processed in the holographic image processor 1100. The memory 1110 may store data that has been processed by the processor 1120 and data to be processed by the processor 1120, or may store data transmitted via the interface 1140. For example, the memory 1110 may store the input image of low resolution that is described above and the CGH image of high resolution transformed from the input image. In addition, the memory 1110 may store data about the input image, e.g., color values, coordinate values, depth values, etc. of pixels in the input image for enabling the processor 1120 to perform the CGH processing, and may store results of a generalized Fresnel transformation (GFT) (in particular, results of the FFT) computed by performing the CGH processing.

The memory 1110 may include any of a random access memory (RAM) such as a dynamic RAM (DRAM) and a static RAM (SRAM), a read-only memory (ROM), an electrically erasable programmable ROM (EEPROM), a compact-disc (CD)-ROM, a Blu-ray or other optical disc storages, a hard disk drive (HDD), a solid state drive (SSD), or a flash memory, and moreover, other external storage devices that may access the holographic image processor 1100.

The display 1130 is hardware for displaying a holographic image in a 3D space based on the CGH image. The display 1130 may include a module for the hologram, such as an SLM, and may also include any of various kinds of display panels, such as a liquid crystal display (LCD), an organic light-emitting diode (OLED), etc. That is, the display 1130 may include various modules and configurations for displaying the holographic image.

The interface 1140 may be implemented as hardware via wired/wireless network interfaces for enabling the holographic image processor 1100 to communicate with other external devices. The interface 1140 may receive the input image that is to be transformed into the CGH image from, for example, an external server, other devices, etc. In addition, the interface 1140 may transmit data about the CGH image to the external server, other devices, etc. so that the holographic image may be displayed or reproduced on other devices.

Figure 12:
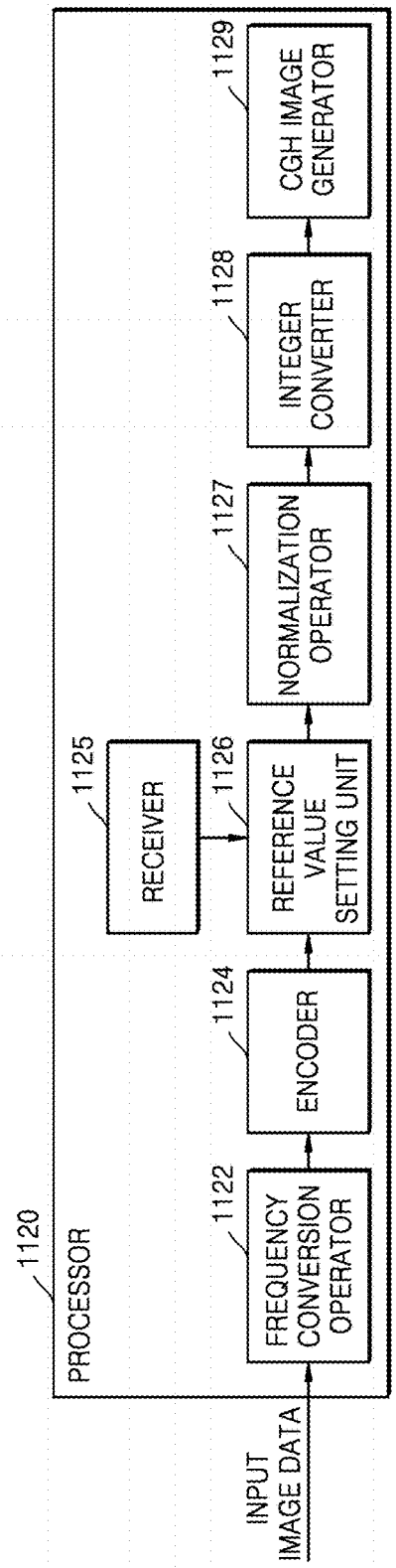
FIG. 12 is a block diagram of a detailed hardware configuration of a processor in FIG. 11, according to the exemplary embodiment.

FIG. 12 is a block diagram of a detailed hardware configuration of the processor 1120 in FIG. 11, according to the exemplary embodiment.

Referring to FIG. 12, the processor 1120 may include a frequency conversion operator (also referred to herein as a "frequency converter") 1122, an encoder 1124, a reference value setting unit (also referred to herein as a "reference value setter") 1126, a normalization operator (also referred to herein as a "normalizer") 1127, an integer converter 1128, a CGH image generator 1129, and a receiver 1125. In FIG. 12, only the elements of the processor 1120 related to one or more exemplary embodiments as described above are shown for convenience of description, and thus, the processor 1120 may further include universal elements other than the elements shown in FIG. 12.

The frequency conversion operator 1122, the encoder 1124, the reference value setting unit 1126, the normalization operator 1127, the integer converter 1128, the CGH image generator 1129, and the receiver 1125 are classified by separate names according to functions thereof, and the frequency conversion operator 1122, the encoder 1124, the reference value setting unit 1126, the normalization operator 1127, the integer converter 1128, the CGH image generator 1129, and the receiver 1125 may correspond to one or more processing modules (or sub-processors) in the processor 1120. Alternatively, the frequency conversion operator 1122, the encoder 1124, the reference value setting unit 1126, the normalization operator 1127, the integer converter 1128, the CGH image generator 1129, and the receiver 1125 may correspond to separate software algorithm units that are classified according to functions thereof. That is, an implementation form of the frequency conversion operator 1122, the encoder 1124, the reference value setting unit 1126, the normalization operator 1127, the integer converter 1128, the CGH image generator 1129, and the receiver 1125 in the processor 1120 is not limited to a certain example.

The frequency conversion operator 1122 may receive input image data and perform frequency conversion on each pixel of the input image data. Furthermore, a holographic image processor may generate a complex array based on a result of the frequency conversion. When the input image data includes a 2D image and depth data, pixels of the input image data may correspond to pixels of the 2D image. In another exemplary embodiment, when the input image data is polygon data, pixels of the input image data may correspond to polygonal surfaces thereof, respectively. Furthermore, when the input image data is 3D voxel data, pixels of the input image data may correspond to voxels. The complex array may be a 2D array or a 3D array comprising complex values. However, a dimension of the complex array may vary.

The encoder 1124 may encode complex values included in the complex array. Furthermore, information about amplitude and phase, on a per-pixel basis, and as represented by complex numbers, may be converted into real numbers by the encoder 1124.

The reference value setting unit 1126 may sort the real number values of the per-pixel amplitude information according to a magnitude by using the holographic image processor. Furthermore, the holographic image processor may set a prescribed-order number from among the real number values of the per-pixel amplitude information to a reference value. For example, the reference value setting unit 1126 may set an Nth largest value from among the real number values of the per-pixel amplitude information to a reference value. The Nth largest value may be changed according to the number of all pixels, a target resolution of a hologram image, or a target value with respect to a total brightness of the hologram image.

The normalization operator 1127 may normalize the real number values of the per-pixel amplitude information by the reference value and according to the processes of FIGS. 4 through 9.

For example, the normalization operator 1127 may divide real number values of the per-pixel amplitude information by a reference value. Furthermore, the normalization operator 1127, if the real number values of the per-pixel amplitude information are greater than the reference value, may change the real number values of the per-pixel amplitude information to the reference value and divide each of the real number values of the per-pixel amplitude information by the reference value.

The normalization operator 1127 may consider a brightness control signal of a hologram image input by a user when performing a normalization operation. The control signal may be input by the user via the interface 1140 of FIG. 11. The receiver 1125 may receive the control signal and transmit the same to the normalization operator 1127. The normalization operator 1127 may normalize real number values of the per-pixel amplitude information based on a reference value and a weight that corresponds to the control signal.

The reference value setting unit 1126 may also set two or more reference values. For example, the reference value setting unit 1126 may set a first-order value to a first reference value $I_1$ and a second-order value to a second reference value $I_2$.

In this case, if the real number values of the per-pixel amplitude information to be changed I are greater than the first reference value $I_1$, the normalization operator 1127 may change the real number values of the per-pixel amplitude information to be changed I to be between the first reference value $I_1$ and the second reference value $I_2$ and divide the changed real number values of the per-pixel amplitude information $I_{mod}$ by the first reference value $I_1$.

The normalization operator 1127 may change the real number values of the per-pixel amplitude information to be changed I to be between the first reference value $I_1$ and the second reference value $I_2$ according to Equation 1.

$$I_{mod} = I_2 + \frac{(I_1 - I_2) \times (I - I_2)}{I_{max} - I_2} \quad \text{[Equation 1]}$$

In Equation 1, I denotes real number values of the per-pixel amplitude information to be changed, $I_{mod}$ denotes changed real number values of the per-pixel amplitude information, $I_1$ denotes a first reference value, $I_2$ denotes a second reference value, and $I_{max}$ denotes a maximum per-pixel amplitude value.

Furthermore, if the real number values of the per-pixel amplitude information to be changed I are less than the first reference value $I_1$ and greater than the second reference value $I_2$, the normalization operator 1127 may change the real number values of the per-pixel amplitude information to be changed I and divide the changed real number values of the per-pixel amplitude information $I_{mod}$ by the first reference value I. The normalization operator 1127 may change the real number values of the per-pixel amplitude information to be changed I by applying Equation 2.

$$I_{mod} = \frac{(I \times I_2)}{I_1} \quad \text{[Equation 2]}$$

The integer converter 1128 may convert the normalized real number values of the amplitude per pixel into integer values. For example, the holographic image processor may convert the real number values of the amplitude per pixel into 8-bit unsigned integer values.

The CGH image generator 1129 may generate a CGH image based on the integer values resulting from the conversion performed by the integer converter 1128. The display 1130 may generate a hologram image visible to a user based on the CGH image.

According to the above-described exemplary embodiments, it is possible to increase the brightness of a hologram image by normalizing real number values of the per-pixel amplitude information based on a prescribed-order number from among the real number values of the per-pixel amplitude information when generating the hologram image.

The exemplary embodiments can be written as computer programs and can be implemented in general-use digital computers that execute the programs using a non-transitory computer readable recording medium. Examples of the non-transitory computer readable recording medium include magnetic storage media (e.g., ROM, floppy disks, hard disks, etc.), optical recording media (e.g., CD-ROMs, or digital versatile discs (DVDs)), etc.

The methods and devices for processing a holographic image according to exemplary embodiments have been described above with reference to FIGS. 1 through 12. According to the above-described exemplary embodiments, the brightness of a hologram image may be improved when normalizing real number values of the per-pixel amplitude information based on a reference value, which is a pre-scribed-order strength value. Furthermore, a rapid change in brightness of frames adjacent to the hologram image may be prevented.

It will be understood that the exemplary embodiments described herein should be considered in a descriptive sense only and not for purposes of limitation. Descriptions of the features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method for processing a holographic image, the method comprising:
    generating a complex array by performing frequency conversion of input image data on a pixel-by-pixel basis;
    encoding per-pixel amplitude information and per-pixel phase information represented by complex numbers included in the complex array into real number values;
    sorting the real number values of the per-pixel amplitude information according to a magnitude and setting a prescribed-order number from among the real number values of the per-pixel amplitude information to a reference value; and
    normalizing the real number values of the per-pixel amplitude information based on the reference value.

2. The method of claim 1, wherein the normalizing the real number values comprises dividing each of the real number values of the per-pixel amplitude information by the reference value.

3. The method of claim 1, wherein the normalizing the real number values comprises changing at least one from among the real number values of the per-pixel amplitude information to the reference value when the at least one from among the real number values of the per-pixel amplitude information is greater than the reference value.

4. The method of claim 2, wherein the normalizing the real number values comprises:
    receiving a control signal that relates to a brightness of a hologram image; and
    normalizing the real number values of the per-pixel amplitude information using a weight that corresponds to the received control signal.

5. The method of claim 1, wherein the setting a prescribed-order number from among the real number values of the per-pixel amplitude information to a reference value comprises setting a first-order value to a first reference value and setting a second-order value to a second reference value.

6. The method of claim 5, wherein the normalizing the real number values comprises:
    changing at least one from among the real number values of the per-pixel amplitude information to be between the first reference value and the second reference value when the at least one from among the real number values of the per-pixel amplitude information is greater than the first reference value; and
    dividing each of the changed at least one from among the real number values of the per-pixel amplitude information by the first reference value.

7. The method of claim 6, wherein the changing the at least one from among the real number values of the per-pixel amplitude information to be between the first reference value and the second reference value is performed according to the following equation:

$$I_{mod} = I_2 + \frac{(I_1 - I_2) \times (I - I_2)}{I_{max} - I_2}$$

where I is the at least one from among the real number values of the per-pixel amplitude information to be changed, $I_{mod}$ is a changed at least one from among the real number values of the per-pixel amplitude information, $I_1$ is the first reference value, $I_2$ is the second reference value, and $I_{max}$ is a maximum value of the per-pixel amplitude information.

8. The method of claim 5, wherein the normalizing the real number values comprises:
    changing at least one from among the real number values of the per-pixel amplitude information when the at least one from among the real number values of the per-pixel amplitude information is less than the first reference value and greater than the second reference value; and
    dividing each of the changed at least one from among the real number values of the per-pixel amplitude information by the first reference value.

9. The method of claim 8, wherein the changing the at least one from among the real number values of the per-pixel amplitude information is performed according to the following equation:

$$I_{mod} = \frac{(I \times I_2)}{I_1}$$

where I is the at least one from among the real number values of the per-pixel amplitude information to be changed, $I_{mod}$ is a changed at least one from among the real number values of the per-pixel amplitude information, $I_1$ is the first reference value, and $I_2$ is the second reference value.

10. The method of claim 1, further comprising:
    converting each of the normalized real number values of the per-pixel amplitude information into a respective integer; and
    generating a computer generated hologram (CGH) image based on the converted integer values.

11. A holographic image processor comprising:
    a frequency converter configured to generate a complex array by performing frequency conversion of input image data on a pixel-by-pixel basis;

an encoder configured to encode per-pixel amplitude information and per-pixel phase information represented by complex numbers included in the complex array into real number values;
a reference value setter configured to sort the real number values of the per-pixel amplitude information according to a magnitude, and to set a prescribed-order number from among the real number values of the per-pixel amplitude information to a reference value; and
a normalizer configured to normalize the real number values of the per-pixel amplitude information based on the reference value.

12. The holographic image processor of claim 11, wherein the normalizer is further configured to divide each of the real number values of the per-pixel amplitude information by the reference value.

13. The holographic image processor of claim 11, wherein the normalizer is further configured to change at least one from among the real number values of the per-pixel amplitude information to the reference value when the at least one from among the real number values of the per-pixel amplitude information is greater than the reference value and to divide each of the real number values of the per-pixel amplitude information by the reference value.

14. The holographic image processor of claim 12, further comprising a receiver configured to receive, from a user, a control signal that relates to a brightness of a hologram image,
wherein the normalizer is further configured to use a weight that corresponds to the control signal for performing the normalization.

15. The holographic image processor of claim 11, wherein the reference value setter is further configured to set a first-order value from among the real number values of the per-pixel amplitude information to a first reference value and to set a second-order value from among the real number values of the per-pixel amplitude information to a second reference value.

16. The holographic image processor of claim 15, wherein the normalizer is further configured to change at least one from among the real number values of the per-pixel amplitude information to be between the first reference value and the second reference value when the at least one from among the real number values of the per-pixel amplitude information is greater than the first reference value, and to divide each of the changed at least one from among the real number values of the per-pixel amplitude information by the first reference value.

17. The holographic image processor of claim 16, wherein the normalizer is further configured to change the at least one from among the real number values of the per-pixel amplitude information to be between the first reference value and the second reference value according to the following equation:

$$I_{mod} = I_2 + \frac{(I_1 - I_2) \times (I - I_2)}{I_{max} - I_2}$$

where I is the at least one from among the real number values of the per-pixel amplitude information to be changed, $I_{mod}$ is a changed at least one from among the real number values of the per-pixel amplitude information, $I_1$ is the first reference value, $I_2$ is the second reference value, and $I_{max}$ is a maximum value of the per-pixel amplitude information.

18. The holographic image processor of claim 15, wherein the normalizer is further configured to change at least one from among the real number values of the per-pixel amplitude information when the at least one from among the real number values of the per-pixel amplitude information is less than the first reference value and greater than the second reference value, and to divide each of the changed at least one from among the real number values of the per-pixel amplitude information by the first reference value.

19. The holographic image processor of claim 18, wherein the normalizer is further configured to change the at least one from among the real number values of the per-pixel amplitude information according to the following equation:

$$I_{mod} = \frac{(I \times I_2)}{I_1}$$

where I is the at least one from among the real number values of the per-pixel amplitude information to be changed, $I_{mod}$ is a changed at least one from among the real number values of the per-pixel amplitude information, $I_1$ is the first reference value, and $I_2$ is the second reference value.

20. The holographic image processor of claim 11, further comprising:
a converter configured to convert each of the normalized real number values of the per-pixel amplitude information into a respective integer; and
a computer generated hologram (CGH) image generator configured to generate a CGH image based on the converted integer values.

* * * * *